US010528387B2

(12) United States Patent
Marmignon

(10) Patent No.: US 10,528,387 B2
(45) Date of Patent: Jan. 7, 2020

(54) COMPUTER PROCESSING SYSTEM WITH RESOURCE OPTIMIZATION AND ASSOCIATED METHODS

(71) Applicant: Citrix Systems, Inc., Fort Lauderdale, FL (US)

(72) Inventor: Pierre Marmignon, Bry (FR)

(73) Assignee: CITRIX SYSTEMS, INC., Fort Lauderdale, FL (US)

(*) Notice: Subject to any disclaimer, the term of this patent is extended or adjusted under 35 U.S.C. 154(b) by 311 days.

(21) Appl. No.: 15/416,090

(22) Filed: Jan. 26, 2017

(65) Prior Publication Data

US 2017/0212790 A1    Jul. 27, 2017

Related U.S. Application Data

(60) Provisional application No. 62/287,638, filed on Jan. 27, 2016.

(51) Int. Cl.
*G06F 9/46* (2006.01)
*G06F 9/48* (2006.01)

(52) U.S. Cl.
CPC .............................. *G06F 9/4881* (2013.01)

(58) Field of Classification Search
None
See application file for complete search history.

(56) References Cited

U.S. PATENT DOCUMENTS

| 7,089,294 B1* | 8/2006 | Baskey | H04L 47/10 |
| | | | 709/203 |
| 9,329,901 B2* | 5/2016 | Sterling | G06F 9/505 |
| 2004/0117540 A1* | 6/2004 | Hahn | G06F 9/5083 |
| | | | 711/100 |
| 2005/0154861 A1* | 7/2005 | Arimilli | G06F 9/5011 |
| | | | 712/216 |
| 2012/0198447 A1* | 8/2012 | Osogami | G06F 9/5066 |
| | | | 718/1 |
| 2016/0036722 A1* | 2/2016 | Obrecht | G06F 9/50 |
| | | | 709/226 |
| 2016/0224258 A1* | 8/2016 | Nevraev | G06F 3/0619 |

* cited by examiner

*Primary Examiner* — Bradley A Teets
(74) *Attorney, Agent, or Firm* — Allen, Dyer, Doppelt + Gilchrist, PA

(57) ABSTRACT

A computer processing system includes a processor configured to execute a process, and a memory coupled to the processor to store known and default resource classifications. The known and default resource classifications correspond to processing priority levels and I/O priority levels. A resource optimization engine is configured to identify the process to be executed, and determine if the process is associated with the known resource classification. If yes, then adjust at least one of the processing priority level and the I/O priority level for the process to the known resource classification. If no, then adjusting at least one of the processing priority level and the I/O priority level for the process to a default resource classification.

16 Claims, 3 Drawing Sheets

US 10,528,387 B2

COMPUTER PROCESSING SYSTEM WITH RESOURCE OPTIMIZATION AND ASSOCIATED METHODS

RELATED APPLICATIONS

This application claims the benefit of provisional application Ser. No. 62/287,638 filed Jan. 27, 2016, which is incorporated herein in its entirety by reference.

TECHNICAL FIELD

The present disclosure relates to the field of computer processing system monitoring, and more particularly, to optimizing resource usage by applications executing within the computer processing system.

BACKGROUND

In a Windows based computing environment, resources such as CPU, Memory and input/output operations per second (IOPS) allocations are not optimized by the underlying operating system. This may create user experience and hardware density issues.

While Windows processes can have several levels of CPU and I/O priorities, and can be spread among one or several CPU/Cores, these settings are not adjusted dynamically to reflect the real user activity. Thus, real user activities may be subject to unnecessary slowdowns.

The same issue exists with the memory (e.g., RAM) resources, where the computing environment relies on developers to properly optimize the amount of memory used by applications. However, the reality is that it is almost never done.

SUMMARY

A computer processing system includes at least one processor configured to execute a process, and at least one memory coupled to the at least one processor that is configured to store known and default resource classifications. The known and default resource classifications may correspond to processing priority levels and I/O priority levels. A resource optimization engine may be configured to identify the process to be executed, and determine if the process is associated with the known resource classification. If the process is associated with the known resource classification, then at least one of the processing priority level and the I/O priority level for the process may be adjusted to the known resource classification. If the process is not associated with the known resource classification, then at least one of the processing priority level and the I/O priority level for the process may be adjusted to the default resource classification.

The resource optimization engine may be further configured to monitor behavior of the process executed by the at least one processor, compare behavior of the executed process to at least one global parameter, and readjust at least one of the processing priority level and the I/O priority level for the executed process if the monitored behavior meets the at least one global parameter.

Monitoring the behavior may comprise determining how much processing is being consumed by the executed process, and the at least one global parameter may comprise a predetermined processor consumption level. The at least one memory may comprise a dedicated memory area for supporting the executed process, and the resource optimization engine may be further configured to reallocate a portion of the dedicated memory area when the amount of consumed processing is less than the predetermined processor consumption level.

The readjusting may comprise changing at least one of the processing priority level and the I/O priority level.

The at least one processor may comprise a plurality of processors, and the resource optimization engine may be further configured to change how many processors are to be used to execute the process based on the known or default resource classification.

The computer processing system may further comprise an operating system stored in the at least one memory, the at least one processor may be configured to operate based on the operating system, and the resource optimization engine may be configured for adjusting the process to the known or default resource classification via the operating system.

The operating system may comprise a Windows™ based operating system, for example. The process may comprise an application.

Another aspect is directed to a method for adjusting resource usage by a process executed within a computer processing system as described above. The method may comprise identifying the process to be executed, and determining if the process has a known resource classification associated therewith. The known resource classification may correspond to a processing priority level and an I/O priority level. If the process is associated with the known resource classification, then at least one of the processing priority level and the I/O priority level for the process may be adjusted to the known resource classification. If the process is not associated with the known resource classification, then at least one of the processing priority level and the I/O priority level for the process may be adjusted to the default resource classification.

The method may further comprise executing the process, monitoring behavior of the executed process, comparing behavior of the executed process to at least one global parameter, and readjusting at least one of the processing priority level and the I/O priority level for the executed process if the monitored behavior meets the at least one global parameter.

Monitoring the behavior may comprise determining how much processing is being consumed by the executed process, and the at least one global parameter may comprises a predetermined processor consumption level.

The computer processing system may comprise at least one memory with a dedicated memory area for supporting the executed process, and the method may further comprise reallocating a portion of the dedicated memory area when the amount of consumed processing is less than the predetermined processor consumption level.

Yet another aspect is directed to a non-transitory computer readable medium having a plurality of computer executable instructions for causing a computer processing system to perform steps comprising identifying a process to be executed on the computer processing system, and determining if the process has a known resource classification associated therewith. The known resource classification may correspond to a processing priority level and an I/O priority level. If the process is associated with the known resource classification, then at least one of the processing priority level and the I/O priority level for the process may be adjusted to the known resource classification. If the process is not associated with the known resource classification, then at least one of the processing priority level and the I/O priority level for the process may be adjusted to the default resource classification.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
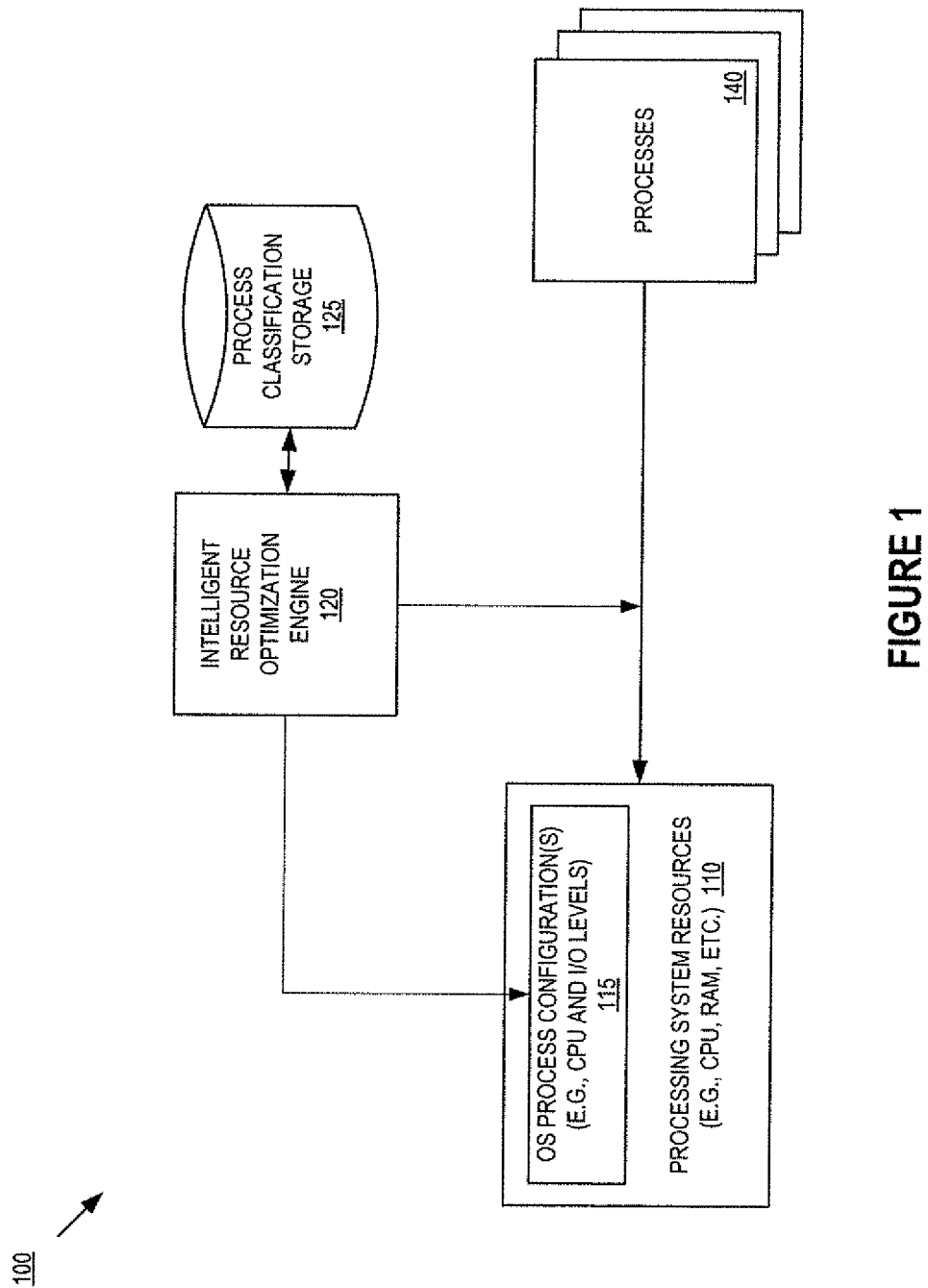
FIG. 1 is a block diagram of a computing environment having an intelligent resource optimization engine for intelligently and dynamically adjusting processing system resources for processes that are executed.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

In the following description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

In the embodiments discussed herein, processes executed in a computing environment, such as a WINDOWS™ computing environment, are subject to optimizations done in parallel with the loading and execution of the application. In one embodiment, a common process behavior analysis engine, referred to herein as an intelligent resource optimization engine, monitors processes and associates those processes with classifications relevant to resource allocation and/or utilization within the computing environment, and adjusts the classifications dynamically as the processes are loaded and executed by the computing environment.

Some portions of the detailed description that follow are presented in terms of algorithms and symbolic representations of operations on data bits within a computer memory. These algorithmic descriptions and representations are used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as generating, converting, executing, storing, receiving, obtaining, constructing, accessing, capturing, or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMS), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates on embodiment of a computing environment 100 having an intelligent resource optimization engine 120 for intelligently and dynamically adjusting processing system resources 110 for processes 140 executed within the computing environment.

In embodiments, computing environments, such as those enabled by the WINDOWS™ operating system, allow the configuration of CPU and I/O priority levels 115.

Typical levels available for one or more processors executing the computing environment 100, referred to herein as CPU(s), are as follows: Realtime, High, Above Normal, Normal, Below Normal, Low, and Idle.

Typical levels for I/O for processes executing within the computing environment 100 are as follows: High, Normal, Low, and Very Low.

On loaded environments, all user processes are competing for CPU and I/O. As a result, this also increases context switches and generates a lot of performance downsides, dramatically decreasing the performances of the applications.

In virtual environments (virtual desktops or server based computing) this default behavior also leads to a low user density (low number of users per server). While users can adjust CPU (not I/O) priorities manually through the task manager, this is not a common usage.

To the exception of some computing system internal processes, all processes generally start with a "normal" priority, regardless of their history of abnormal behavior. While one could programmatically decrease the priority of a process when the process is having an abnormal behavior, it is not enough.

The effect of such a technique depends on the priority levels gap between the process having an abnormal behavior and the others. If a process is having an abnormal behavior, lowering its priority will have an effect but the impact will be lower if all processes are running at the "normal" priority compared to a situation where other processes would be running at the "high" priority level which is not the default. For example, if a process is consuming 100% of CPU and is decreased to a low or idle priority level, it will still impact processes running at the "normal" priority level (slowing them down) while it would not impact processes running at the "high" priority level.

Another reason is that because the decision of lowering the priority is made only after a sample time, this leads to a global system slowdown during the sample time.

Yet another reason is that such a technique does not properly isolate the abnormal process that will still have the ability to consume as many CPU resources as it can.

Another more aggressive technique, called clamping, consists in pausing/restarting a process at a low interval of time (usually in milliseconds) to limit the maximum amount of CPU it could use. This technique will have a dramatic effect on the user experience as it is creating a saw tooth effect on application responsiveness and the process CPU usage.

Today's computers are usually equipped with multiple CPU or single CPU with multiple cores. Computing systems, such as MICROSOFT WINDOWS™ operating systems, expose a setting, called affinity, allowing the configuration of one or several core(s) where application processes, such as processes 140, will be executed.

Old applications are likely to start with a single CPU/core affinity or with an affinity lower than the number of cores which could lead to low performances. CPU/cores are internally identified with an Id and it appears that in a normal environment when lower Id cores are saturated there is a big slowdown of the operating system itself.

In one embodiment, the intelligent optimization engine 120 will classify running user processes (e.g., processes 140) as belong to one of a plurality of different classification levels indicative of a process's known behavior. For example, the classification levels could be as follows: Good, Bad, Really bad, and Really Really bad.

By default, unless a rule has been specified for a specific process, the specific process will be considered as good until the actual behavior of the processes is known as discussed below.

As soon as a process is started, the intelligent resource optimization engine 120 will adjust the process's CPU and I/O priorities and CPU/Cores affinity against:

Any manual rule that would have been defined by an administrator.

Rules defined by the self-learning mechanisms of the intelligent resource optimization engine 120 may be as follows:

If the process is known as "Good", CPU priority will be adjusted to "High", I/O priority to "High" and affinity to all available CPU/Cores;

If the process is known as "Bad", CPU priority will be adjusted to Above Normal, I/O priority won't be adjusted so will stay at "Normal" and affinity will not be adjusted;

If the process is known as "Really Bad", CPU priority will be adjusted to Normal, I/O priority to low and affinity will not be adjusted; and If the process is known as "Really Really Bad", CPU priority will be adjusted to "Below Normal", I/O priority to "Low" and affinity will not be adjusted.

With such a system, any preconfigured or well known "Bad" process/application will not have the ability to slow down other applications or the operating system itself because the more an application/process is identified as "Bad", the bigger the priority gap is. Adjustments are done right at process creation and not after a trigger.

Also, if other applications are not demanding resources the application will remain unaffected and will not show any performance slowdown.

The benefits associated with intelligent and evolving processes classification can be understood by the following example. Suppose, a user has started to work and his applications have been adjusted as "good". Then an antivirus scan starts. As CPU and I/O priorities have been adjusted to "High", the user's applications won't experience the usual slowdown caused by the antivirus software.

In one embodiment, the engine will monitor processes activity and check their behavior against a global rule. The global rule defines when a process is experiencing abnormal CPU consumption. In one embodiment, the rule is expressed in an average CPU consumption (expressed in percent of total CPU usage) over a specified period of time (in seconds).

One example of a rule for use by the intelligent resource optimization engine 120 is a rule where a process will be considered as having an abnormal behavior when it is exceeding 20% of CPU for 30 seconds. When such a rule is satisfied (e.g., the processes exceeds the CPU usage % for the period of time), the processes classification can be adjusted accordingly.

In embodiments, an extension to this global CPU-based rule is an I/O based rule for I/O optimization. When a process will trigger this global rule is as follows: priorities and affinity will be adjusted for a specified period of time (called "Idle Time"); CPU priority will be set to "Idle"; I/O priority will be set to "Very Low"; and affinity will be adjusted to a preconfigured number of CPU/Core(s) but limited to the highest core Ids to preserve the operating system.

In other embodiments, the intelligent resource optimization engine 120 will remember behavior and/or classifications associated with processes, and add the process to its table of "known processes" (e.g., processes classification storage 125).

The effect will be to park a process that is currently having an abnormal behavior for a specific period of time dramatically restricting the amount of CPU & I/O it can consume and thus preserving the system and other applications.

When idle time is over, previous priorities and affinity will be restored according to any user defined rule, any self-learning algorithm rule, or based on a previous state.

Each time a process has triggered the rule on a specific computer/machine, the processes is remembered and based on this memory the intelligent algorithm will be able to classify processes and take actions accordingly.

In embodiments, while adjusting priorities allows intelligent resource optimization engine 120 to give precedence to some applications/process over others, limit the affinity to highest Ids cores/CPUs, etc., the intelligent resource optimization engine 120 allows limiting the maximum amount of CPU an application/process can consume without having to use more aggressive techniques (such as clamping) that would dramatically affect the user experience (i.e., freezing applications).

Although the intelligent optimization engine 120 does not utilize CPU clamping techniques, in one embodiment, it could implement both techniques to solve different issues. In this case, any clamped process will be excluded from the intelligent engine.

Furthermore, while computing systems generally provide APIs to clean a process memory, such as discarding unused pages, this process is not automatic and should be implemented by application developers (which again they rarely do). This leads to applications overconsuming the physical memory (RAM) causing users to add more and more memory to their computers/servers. In one embodiment, intelligent resource optimization engine 120 will monitor processes activity, and based on an activity rule, will periodically trigger computing system APIs responsible that enable processes memory to be reallocated (e.g., move unused memory pages to the pagefile), and thus free physical memory for other processes also running on the same device dramatically decreasing the amount of minimum required physical memory per user.

Figure 2:
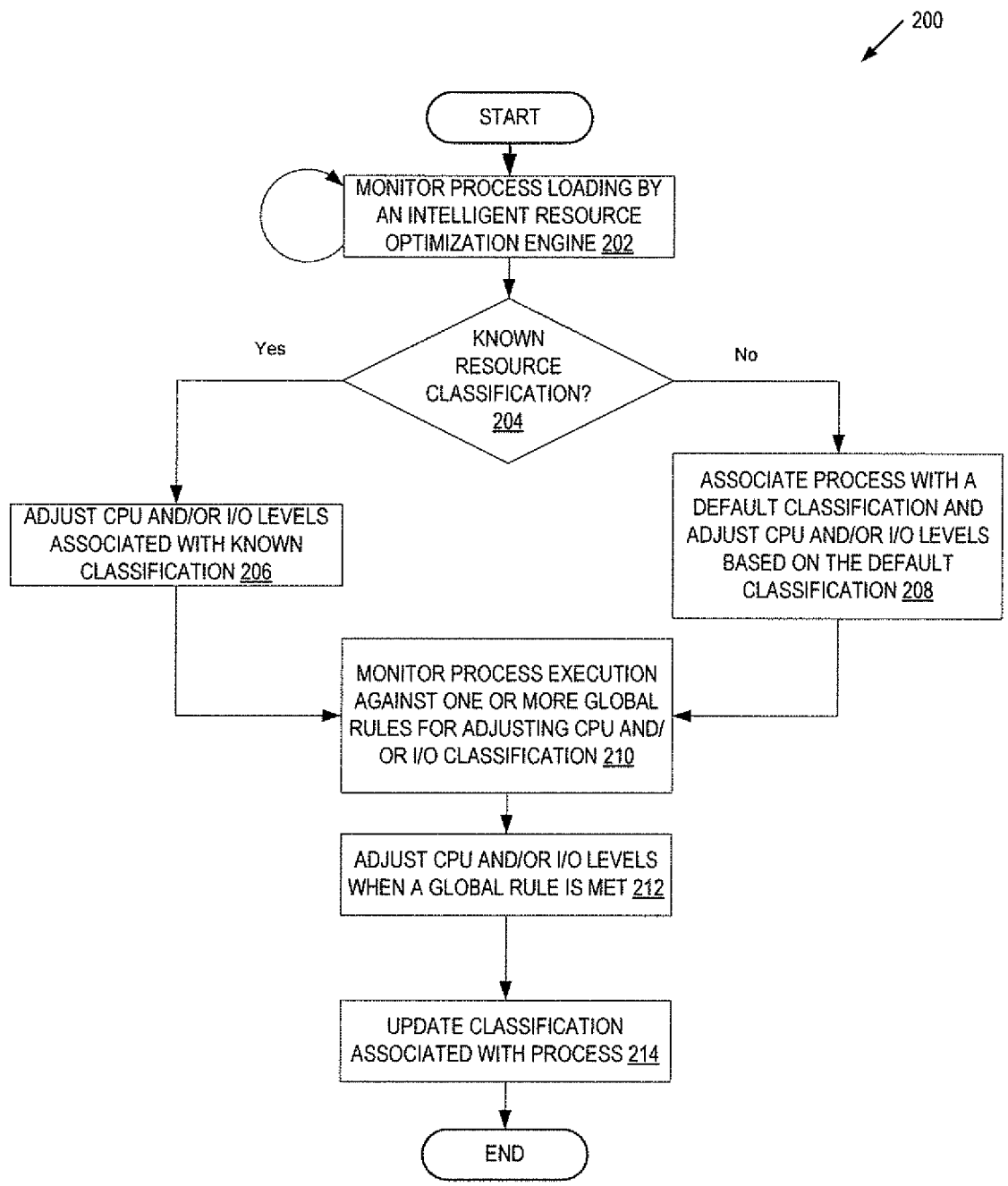
FIG. 2 is a flow chart illustrating a process for intelligently managing computing systems resources consumed by processes executing within the computing system.

FIG. 2 is a flow chart 200 illustrating a process for intelligently managing computing systems resources consumed by processes executing within the computing system. The process is performed by processing logic that may comprise hardware (circuitry, dedicated logic, etc.), software (such as is run on a general purpose computer system or a dedicated machine), firmware, or a combination. In one embodiment, the process is performed by the intelligent resource allocation engine 120.

From the start, the method comprises identifying the process to be executed at Block 202, and determining if the process has a known resource classification associated therewith at Block 204. The known resource classification corresponds to a processing priority level and an I/O priority level.

If the process is associated with the known resource classification, then at least one of the processing priority level and the I/O priority level for the process may be adjusted to the known resource classification at Block 206.

If the process is not associated with the known resource classification, then at least one of the processing priority level and the I/O priority level for the process may be adjusted to the default resource classification at Block 208.

The process further includes executing the process and monitoring behavior of the executed process, and comparing behavior of the executed process to at least one global parameter at Block 210. At least one of the processing priority level and the I/O priority level is readjusted at Block 212 for the executed process if the monitored behavior meets the at least one global parameter. The resource classification is then updated at Block 214.

Monitoring the behavior includes determining how much processing is being consumed by the executed process, and the at least one global parameter includes a predetermined processor consumption level. The computer processing system includes at least one memory with a dedicated memory area for supporting the executed process, and the method further includes reallocating a portion of the dedicated memory area when the amount of consumed processing is less than the predetermined processor consumption level.

The readjusting includes changing at least one of the processing priority level and the I/O priority level.

The computer processing system includes a plurality of processors, and the method further includes adjusting further comprises changing how many processors are to be used to execute the process based on the known or default resource classification.

The computer processing system includes an operating system that is configured for adjusting the process to the known or default resource classification. As noted above, the operating system includes a Windows™ based operating system, for example. Alternatively, the intelligent resource optimization engine 120 is applicable to operating systems other than Windows™.

Figure 3:
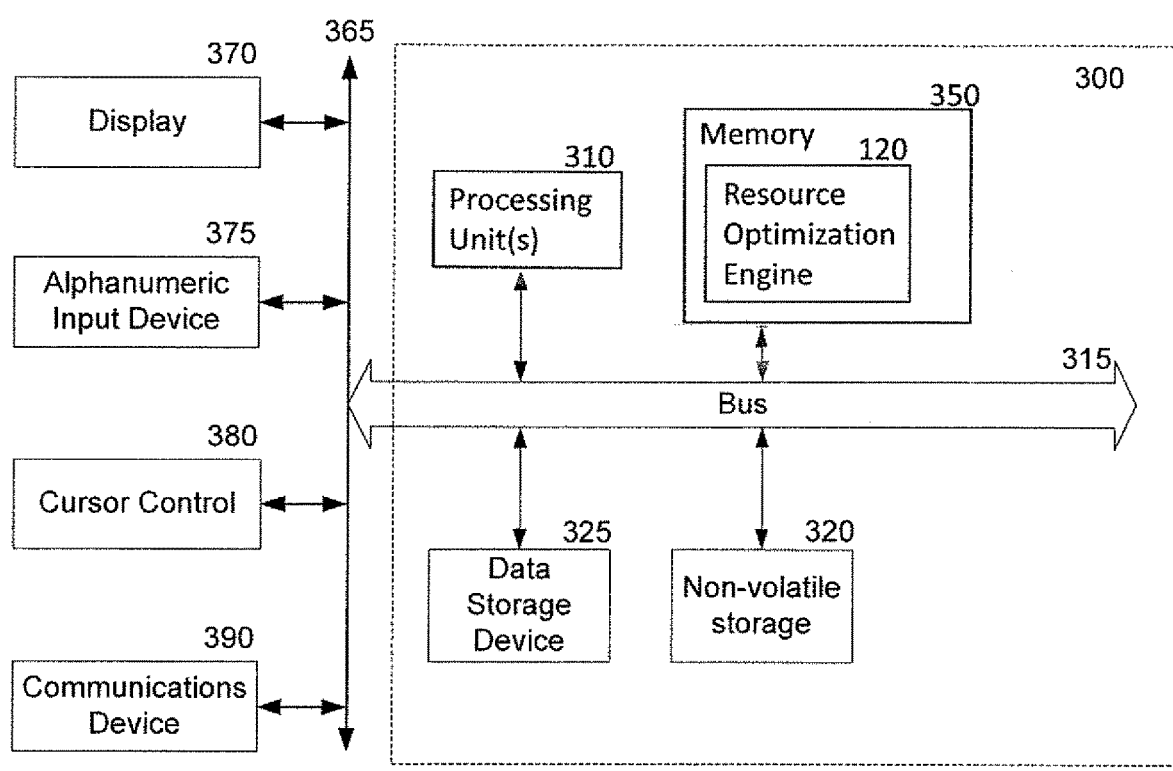
FIG. 3 is one embodiment of a computer system that may be used with the present invention.

FIG. 3 is one embodiment of a computer system that may be used with the present invention. It will be apparent to those of ordinary skill in the art, however that other alternative systems of various system architectures may also be used.

The data or computer processing system 300 illustrated in FIG. 3 includes a bus or other internal communication means 315 for communicating information, and at least one processor 310 coupled to a first bus 315 for processing information. The system further comprises at least one random access memory (RAM) or other volatile storage device 350 (referred to as memory), coupled to the first bus 315 for storing information and instructions to be executed by processor 310. The at least one main memory 350 also may be used for storing temporary variables or other intermediate information during execution of instructions by the at least one processor 310. The system also comprises a read only memory (ROM) and/or static storage device 320 coupled to the first bus 315 for storing static information and instructions for the at least one processor 310, and a data storage device 325, such as a magnetic disk or optical disk and its corresponding disk drive. The data storage device 325 is coupled to the first bus 315 for storing information and instructions. For illustration purposes, the resource optimization engine 120 is stored in the at least one main memory 350. The resource optimization engine 120 may be stored and/or accessible by the computer processing system 300 in locations other than the at least one main memory 350, as discussed below.

The computer processing system 300 may further be coupled to a display device 370, such as a liquid crystal display (LCD), coupled to the first bus 315 through a second bus 365 for displaying information to a computer user. An alphanumeric input device 375, including alphanumeric and other keys, may also be coupled to first bus 315 through the second bus 365 for communicating information and command selections to the at least one processor 310. An additional user input device is a cursor control device 380, such as a touchpad, mouse, a trackball, stylus, or cursor direction keys coupled to the first bus 315 through the second bus 365 for communicating direction information and command selections to the at least one processor 310, and for controlling cursor movement on the display device 370.

Another device, which may optionally be coupled to the computer processing system 300, is a communication device 390 for accessing other nodes of a distributed system via a network. The communication device 390 may include any of a number of commercially available networking peripheral devices, such as those used for coupling to an Ethernet, token ring, Internet, or wide area network. The communication device 390 may further be a null-modem connection, or any other mechanism that provides connectivity between the computer system 300 and the outside or external world. Note that any or all of the components of this system illustrated in FIG. 3 and associated hardware may be used in various embodiments of the present invention.

It will be appreciated by those of ordinary skill in the art that any configuration of the system may be used for various purposes according to the particular implementation. The control logic or software implementing the present invention can be stored in the main memory 350, mass storage device 325, or other storage medium locally or remotely accessible to the at least one processor 310.

It will be apparent to those of ordinary skill in the art that the system, method, and process described herein can be implemented as software stored in the main memory 350 or the read only memory 320 and executed by the at least one processor 310. This control logic or software may also be resident on an article of manufacture comprising a computer readable medium having computer readable program code embodied therein and being readable by the mass storage device 325 and for causing the processor 310 to operate in accordance with the methods and teachings herein.

For example, a non-transitory computer readable medium may have a plurality of computer executable instructions for causing the computer processing system 300 to perform steps comprising identifying a process to be executed on the computer processing system, and determining if the process has a known resource classification associated therewith. The known resource classification may correspond to a processing priority level and an I/O priority level. If the process is associated with the known resource classification, then at least one of the processing priority level and the I/O priority level for the process may be adjusted to the known resource classification. If the process is not associated with the known resource classification, then at least one of the processing priority level and the I/O priority level for the process may be adjusted to the default resource classification.

The present invention may also be embodied in a handheld or portable device containing a subset of the computer hardware components described above. For example, the handheld device may be configured to contain only the first bus 315, the at least one processor 310, and memory 350 and/or 325. The handheld device may also be configured to include a set of buttons or input signaling components with which a user may select from a set of available options. The handheld device may also be configured to include an output apparatus, such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include at least one processor 310, a data storage device 325, a bus 315, and a memory 350, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A computer processing system comprising:
at least one processor configured to execute a process;
at least one memory coupled to said at least one processor and configured to store known and default resource classifications, with the known and default resource classifications corresponding to processing priority levels and I/O priority levels;
said at least one processor is further configured to perform the following
identifying the process to be executed,
determining if the process is associated with the known resource classification,
if yes, then adjusting at least one of the processing priority level and the I/O priority level for the process to the known resource classification, and
if no, then adjusting at least one of the processing priority level and the I/O priority level for the process to the default resource classification,
executing the process,
monitoring behavior of the executed process by determining how much processing is being consumed by the executed process,
comparing behavior of the executed process to at least one global parameter comprising a predetermined processor consumption level, and
readjusting at least one of the processing priority level and the I/O priority level for the executed process if the monitored behavior meets the at least one global parameter; and
said at least one memory comprises a dedicated memory area for supporting the executed process, and wherein said at least one processor is further configured to reallocate a portion of the dedicated memory area when an amount of consumed processing is less than the predetermined processor consumption level.

2. The computer processing system according to claim 1 wherein the readjusting comprises changing at least one of the processing priority level and the I/O priority level.

3. The computer processing system according to claim 1 wherein said at least one processor comprises a plurality of processors, and wherein the adjusting further comprises changing how many processors are to be used to execute the process based on the known or default resource classification.

4. The computer processing system according to claim 1 further comprising an operating system stored in said at least one memory, wherein said at least one processor is configured to operate based on the operating system, and wherein said at least one processor is further configured for adjusting the process to the known or default resource classification via the operating system.

5. The computer processing system according to claim 4 wherein the operating system comprises a Windows™ based operating system.

6. The computer processing system according to claim 1 wherein the process comprises an application.

7. A method for adjusting resource usage by a process executed within a computer processing system, the method comprising:
- identifying the process to be executed;
- determining if the process has a known resource classification associated therewith, with the known resource classification corresponding to a processing priority level and an I/O priority level;
  - if yes, then adjusting at least one of the processing priority level and the I/O priority level for the process to the known resource classification, and
  - if no, then adjusting at least one of the processing priority level and the VO priority level for the process to a default resource classification;
- executing the process;
- monitoring behavior of the executed process by determining how much processing is being consumed by the executed process;
- comparing behavior of the executed process to at least one global parameter comprising a predetermined processor consumption level;
- readjusting at least one of the processing priority level and the I/O priority level for the executed process if the monitored behavior meets the at least one global parameter; and
- reallocating a portion of a dedicated memory area supporting the executed process when an amount of consumed processing is less than a predetermined processor consumption level.

8. The method according to claim 7 wherein the readjusting comprises changing at least one of the processing priority level and the VO priority level.

9. The method according to claim 7 wherein the computer processing system comprises a plurality of processors, and wherein the adjusting further comprises changing how many processors are to be used to execute the process based on the known or default resource classification.

10. The method according to claim 7 wherein the computer processing system comprises an operating system that is configured for adjusting the process to the known or default resource classification.

11. The method according to claim 10 wherein the operating system comprises a Windows™ based operating system.

12. A non-transitory computer readable medium having a plurality of computer executable instructions for causing a computer processing system to perform the following:
- identifying a process to be executed on the computer processing system;
- determining if the process has a known resource classification associated therewith, with the known resource classification corresponding to a processing priority level and an I/O priority level;
  - if yes, then adjusting at least one of the processing priority level and the I/O priority level for the process to the known resource classification, and
  - if no, then adjusting at least one of the processing priority level and the VO priority level for the process to a default resource classification;
- executing the process;
- monitoring behavior of the executed process by determining how much processing is being consumed by the executed process;
- comparing behavior of the executed process to at least one global parameter comprising a predetermined processor consumption level;
- readjusting at least one of the processing priority level and the I/O priority level for the executed process if the monitored behavior meets the at least one global parameter; and
- reallocating a portion of a dedicated memory area supporting the executed process when an amount of consumed processing is less than the predetermined processor consumption level.

13. The non-transitory computer readable medium according to claim 12 wherein the readjusting comprises changing at least one of the processing priority level and the I/O priority level.

14. The non-transitory computer readable medium according to claim 12 wherein the computer processing system comprises a plurality of processors, and wherein the adjusting further comprises changing how many processors are to be used to execute the process based on the known or default resource classification.

15. The non-transitory computer readable medium according to claim 12 wherein the computer processing system comprises an operating system that is configured for adjusting the process to the known or default resource classification.

16. The non-transitory computer readable medium according to claim 15 wherein the operating system comprises a Windows™ based operating system.

* * * * *